(12) United States Patent
Hosokawa

(10) Patent No.: US 8,311,103 B2
(45) Date of Patent: Nov. 13, 2012

(54) IMAGE RECORDING APPARATUS FOR RECORDING IMAGE DATA WITH DISPLAY ORDER FIELD

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1447 days.

(21) Appl. No.: 11/460,403

(22) Filed: Jul. 27, 2006

(65) Prior Publication Data
US 2007/0031129 A1 Feb. 8, 2007

(30) Foreign Application Priority Data
Aug. 2, 2005 (JP) ................................. 2005-224479

(51) Int. Cl.
*H04N 7/12* (2006.01)
*H04N 11/02* (2006.01)

(52) U.S. Cl. .............................. 375/240.12; 375/240.26

(58) Field of Classification Search ............. 375/240.26, 375/240.12
See application file for complete search history.

(56) References Cited

U.S. PATENT DOCUMENTS
5,771,357 A 6/1998 Kato
7,474,841 B2 * 1/2009 Nozawa ........................ 386/232

FOREIGN PATENT DOCUMENTS
JP 9-121360 A 5/1997
JP 2000-253308 A 9/2000

* cited by examiner

*Primary Examiner* — Jay Patel
*Assistant Examiner* — Richard Torrente
(74) *Attorney, Agent, or Firm* — Canon U.S.A., Inc. IP Division

(57) ABSTRACT

A recording apparatus includes a receiving unit to receive first moving image data of a first predetermined number of frames per second (fps) and second moving image data of a second predetermined number of fps converted from moving image data of a third predetermined number of fps using pull down, a coding unit to code the moving image data selectively using intra-frame coding, forward inter-frame coding, and bidirectional inter-frame coding in a predetermined order, a recording unit to record a coded stream on a storage medium, a switching unit to switch a first mode for recording the first moving image data and a second mode for recording the second moving image data, and a control unit to, in response to a recording start instruction in the second mode, control the coding and recording units to start recording at a specific frame of the frames of the second moving image data.

7 Claims, 11 Drawing Sheets

IMAGE RECORDING APPARATUS FOR RECORDING IMAGE DATA WITH DISPLAY ORDER FIELD

BACKGROUND OF THE INVENTION

1. Field of the Invention

The present invention relates to an image recording apparatus.

2. Description of the Related Art

Video cameras that record captured picture signals on magnetic tape are well known. In recent years, a video camera has emerged that codes a captured picture signal in the Moving Picture Experts Group (MPEG) standard and records it.

Generally, video cameras of this type capture and record picture signals of 60 fields per second under the National Television System Committee (NTSC) system. Video cameras have also appeared that have a capability of capturing a picture signal of 24 frames per second, like a movie, as well as a picture signal of 60 fields per second, converting it into a picture signal of 60 frames per second, and recording the converted signals.

As a method of converting a film source like a movie into an interlaced video signal, a technique of 2-3 pull down is widely used. A film runs at 24 frames per second, whereas a video runs at 30 frames (60 fields) per second. Therefore, the number of fields is converted. More specifically, as shown in FIG. 1, a redundant field (hereinafter referred to as a repeat field) is interposed every other frame to convert the number of fields.

Since a video signal subjected to 2-3 pull down has a repeat field every other frame, a frame that starts at a top field and a frame that starts at a bottom field are alternated every two frames.

On the other hand, when a normal interlaced video signal of 60 fields is recorded under the MPEG standard, since two fields counting from a top field are generally coded as one frame, all frames start at their top fields.

As shown in FIG. 2, with a video camera, in the case where MPEG data that have been coded using 2-3 pull down and MPEG data that have been coded from a normal 60-field picture signal are subjected to connection recording on tape, a field alternation error of consecutive top fields may occurs depending on connected fields, and this may cause unsmooth playback.

One approach to this problem is discussed in Japanese Patent Laid-Open No. 9-121360. In this patent document, compression coding is performed in units of fields, and a field to start cording and a field to stop coding are defined, thereby enabling connection editing and recording of streams.

However, as shown in FIG. 3, because an apparatus disclosed in the patent document defines the sequence of top and bottom fields in coding order, connection editing and recording to MPEG data that have been coded using 2-3 pull down cannot be carried out appropriately.

At a point of connection editing and recording, a field gap occurs.

Additionally, as shown in FIG. 4, because a repeat field is not defined, a decoding time period which is not required normally is required at a connection point. At an area 401, although a normal 60-field interlaced stream, a decoding time period of 3 fields is required. This kind of streams is prone to causing various problems in coding and decoding stages.

Therefore, such connection recording can be disabled. However, for the apparatus disclosed in Japanese Patent Laid-Open No. 9-121360, it is difficult to support various types of formats and solve problems that may occur in coding and decoding.

SUMMARY OF THE INVENTION

The present invention is directed to generation of a continuous compressed and coded stream that does not have a field alternation error and a field gap occurring during connection editing and recording.

According to an aspect of the present invention, a recording apparatus includes a receiving unit configured to receive different types of moving image data segments, each moving image data segment having a plurality of frames, the different types of moving image data segments including a first moving image data segment of an interlaced type of a first predetermined number of frames per second (e.g., 30) and a second moving image data segment of a second predetermined number of frames per second (e.g., 30), a top field of each frame of the first moving image data segment being displayed first, the second moving image data segment being converted from a moving image data segment of a progressive type of a third predetermined number of frames per second (e.g., 24) by being subjected to pull down processing (e.g., 2-3 pull down processing) in which a single redundant field is added every other frame; a coding unit configured to code the moving image data segments received by the receiving unit while selecting a coding method from among intra-frame coding, forward inter-frame prediction coding, and bidirectional inter-frame prediction coding in a predetermined order and to generate a coded stream; a recording unit configured to record the coded stream generated by the coding unit on a storage medium; a mode switching unit configured to switch between a first recording mode for receiving and recording the first moving image data segment and a second recording mode for receiving and recording the second moving image data segment; an instructing unit configured to provide an instruction to start recording of the moving image data segment; and a control unit configured to, in response to the instruction to start recording received from the instructing unit, control the coding unit to start coding processing and control the recording unit to start recording operation. In the second recording mode, the control unit is configured to control the coding unit and the recording unit to start recording at a specific frame from among the frames of the received second moving image data segment, the specific frame including a top field displayed first and a redundant field.

Further features of the present invention will become apparent from the following description of exemplary embodiments with reference to the attached drawings.

DESCRIPTION OF THE EMBODIMENTS

Figure 1:
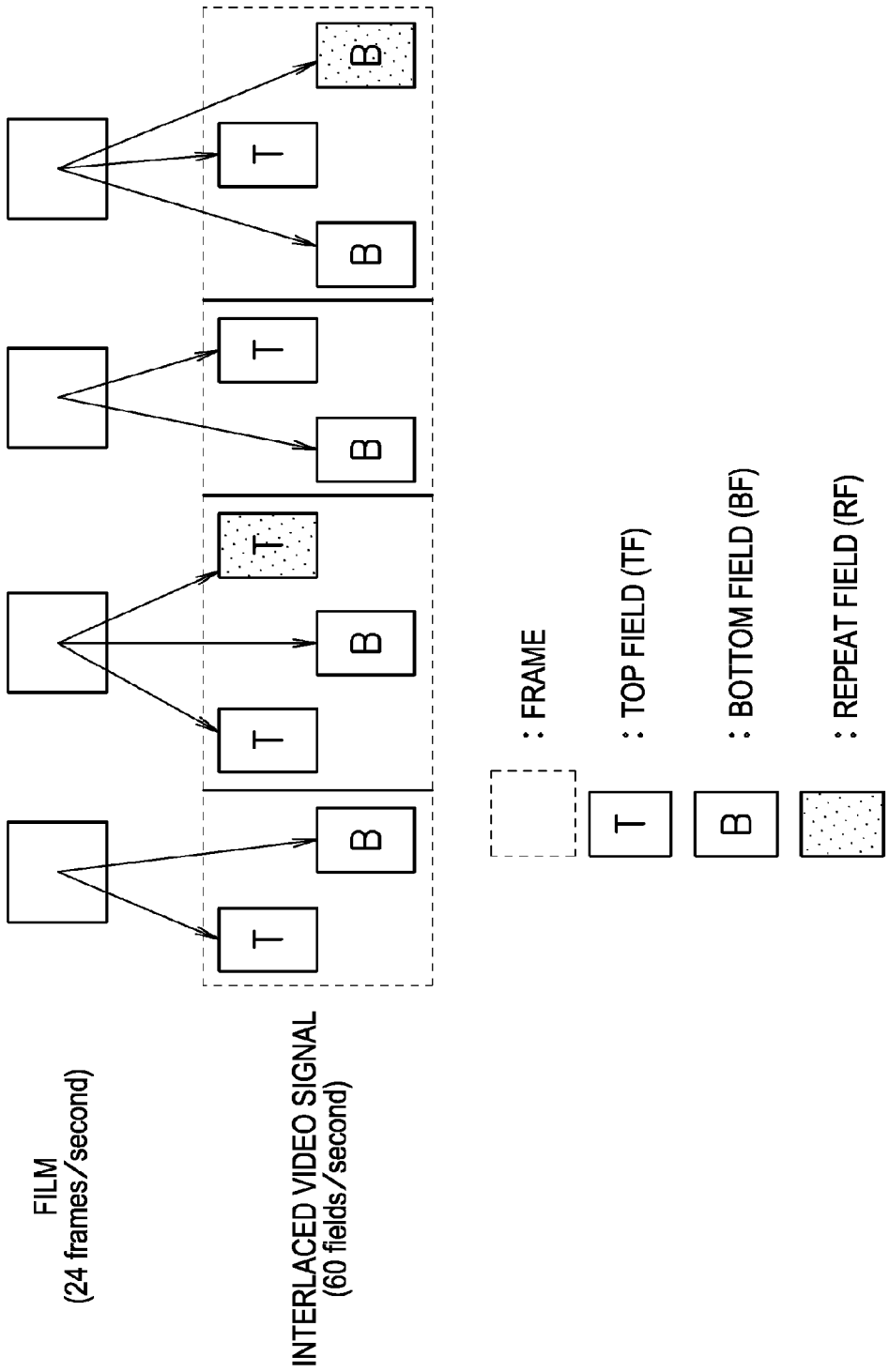
FIG. 1 illustrates how 2-3 pull down is performed.
Figure 2:
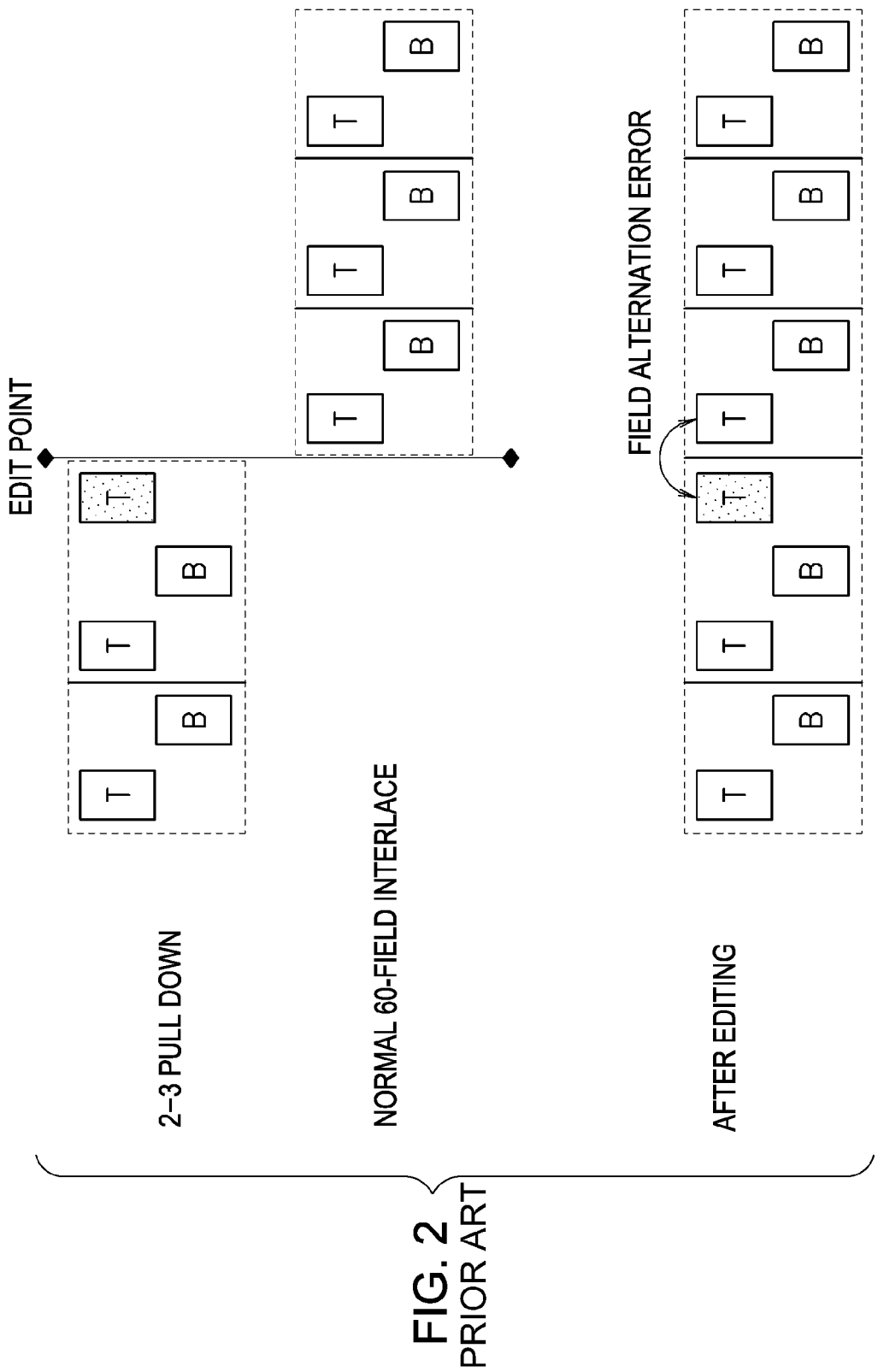
FIG. 2 illustrates how a field alternation error occurs during connection editing and recording.
Figure 3:
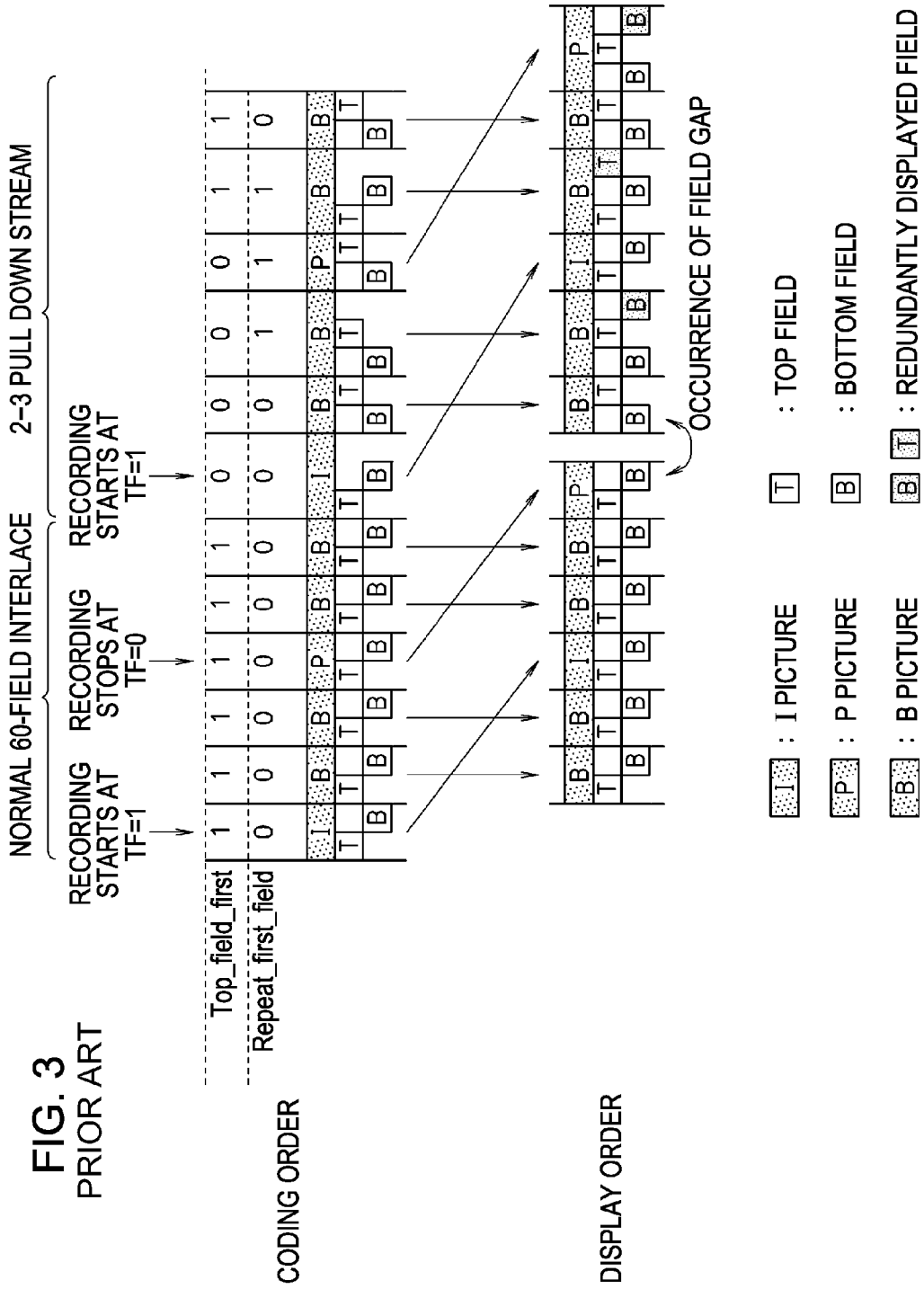
FIG. 3 illustrates one example in which an error occurs during connection editing and recording in processing in conventional systems, such as those disclosed in Japanese Patent Laid-Open No. 9-121360.
Figure 4:
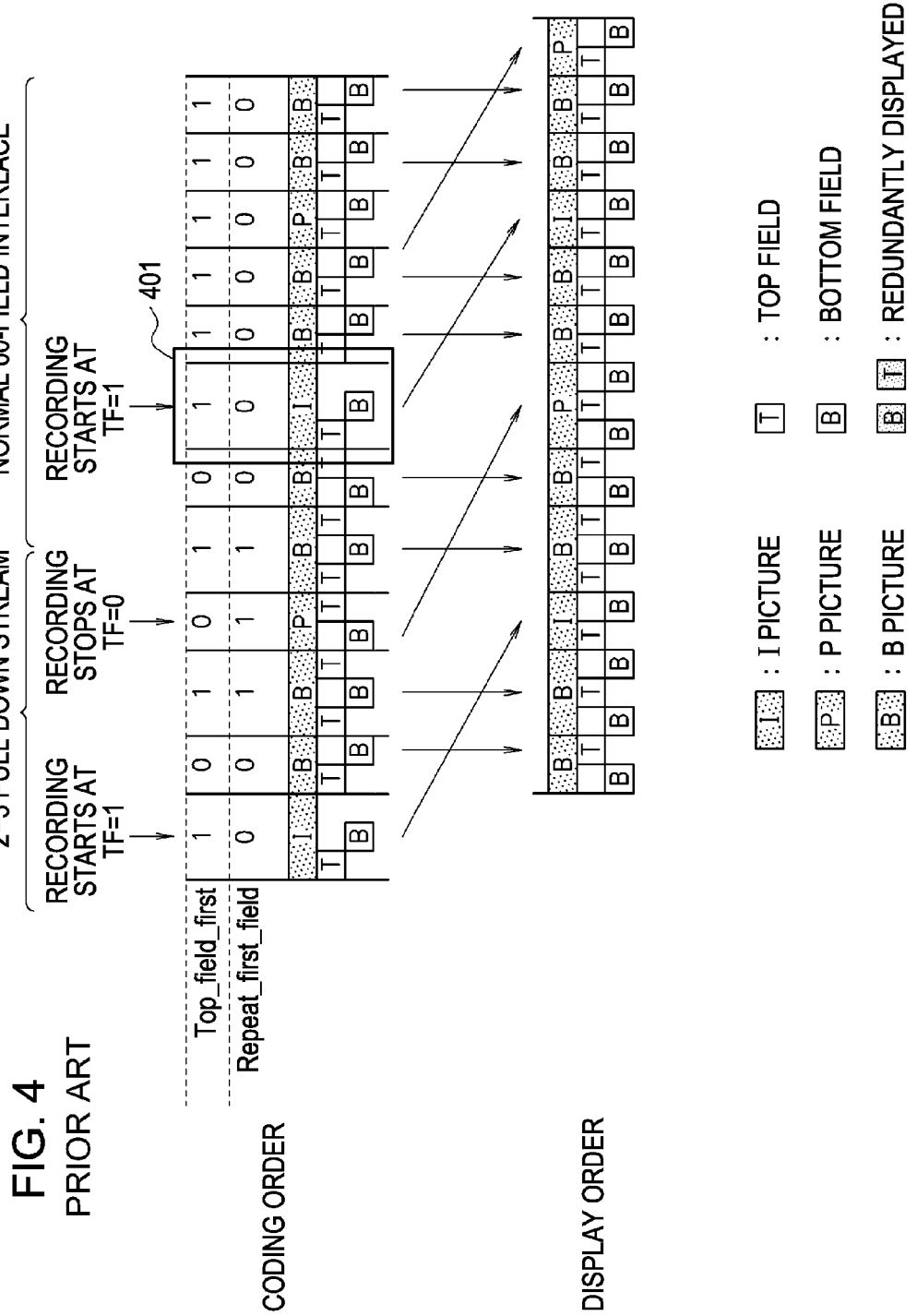
FIG. 4 illustrates one example in which another error occurs during connection editing and recording in processing in conventional systems, such as those disclosed in Japanese Patent Laid-Open No. 9-121360.
Figure 5:
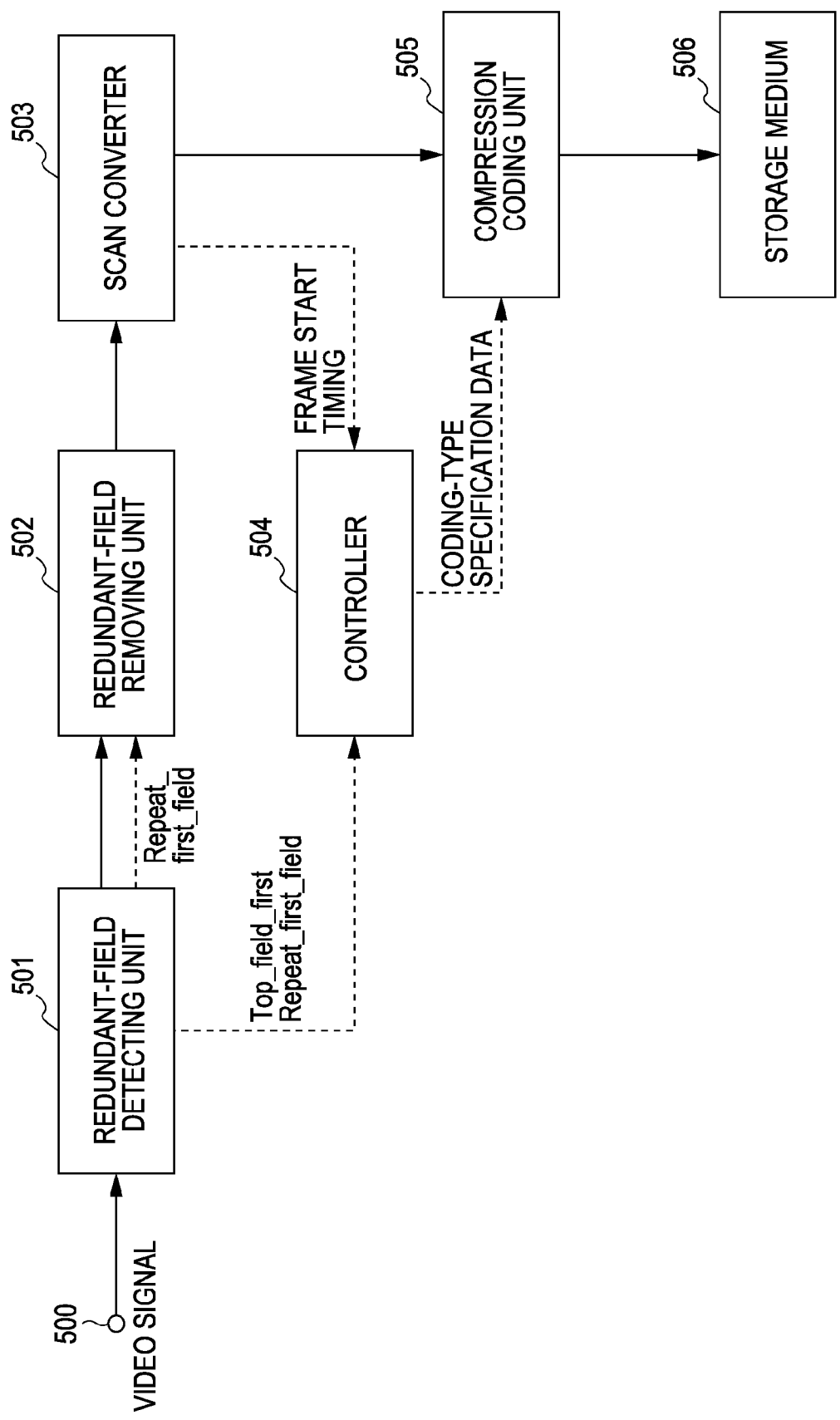
FIG. 5 is a block diagram of an image recording apparatus according to an exemplary embodiment of the present invention.

Exemplary embodiments are described below. FIG. 5 is a block diagram of an image recording apparatus according to one exemplary embodiment of the present invention. When the image recording apparatus receives a video signal in which information obtained from an image pickup device is digitized, for example, the image recording apparatus compresses and codes the video signal based on the so-called MPEG-2 standard and records the compressed and coded data on a sequentially accessible storage medium (e.g., magnetic recording tape). The image recording apparatus can record a compressed and coded bit stream including at least one of an I picture, a P picture, and a B picture.

The I picture refers to an intra-frame coded picture which is coded using picture data of the frame alone. The P picture refers to a forward predictive coded picture in which a difference signal to a predictive picture being the previous I or P picture frame is coded. The B picture refers to a bidirectionally predictive coded picture in which difference signals to predictive pictures being both previous and future frames are coded.

A video-signal input terminal 500 is configured to receive a video signal that is selected from among a progressive signal of 30 frames per second, an interlaced signal of 30 frames per second, and a signal in which a progressive signal of 24 frames per second is subjected to 2-3 pull down.

Hereinafter, a progressive type of 30 frames per second is referred to as "30p", an interlaced type of 30 frames per second is referred to as "60i", and a type in which a progressive type of 24 frames per second is subjected to 2-3 pull down is referred to as "24p".

A redundant-field detecting unit 501 is configured to detect Repeat_first_field and Top_field_first from a received video signal using a technique described below. A redundant-field removing unit 502 is configured to remove a redundant field on the basis of Repeat_first_field detected by the redundant-field detecting unit 501. A scan converter 503 is configured to convert a received video signal into predetermined units of coding processing and supply the converted data to a compression coding unit 505 as an input frame data. The compression coding unit 505 is configured to compress and code the received input frame data and generate an MPEG-2 stream. A storage medium 506 is configured to store the MPEG-2 stream. A controller 504 is configured to control each block. More specifically, the controller 504 is configured to receive Top_field_first and Repeat_first_field from the redundant-field detecting unit 501, receive a frame start timing from the scan converter 503, and output coding-type specification data to the compression coding unit 505. The storage medium 506 can record 30p, 60i, and 24p data.

Detection of a redundant field in the redundant-field detecting unit 501 is described below.

The redundant-field detecting unit 501 stores a video signal two fields before a currently input field and detects equality between them. For example, if the absolute value of a difference in pixel between the two fields is smaller than a predetermined threshold, it is determined that the current field is a redundant field having the same field parity, and Repeat_first_field is set to 1 (true). If the absolute value of the difference is larger than the predetermined threshold, it is determined that no redundant field is present, and Repeat_first_field is set to 0 (false).

In MPEG-2, a header of each frame includes information on Top_field_first which is a flag that indicates a field to be displayed first in the two fields of one frame. If Top_field_first=1, top field first, a top field is displayed first. If Top_field_first=0, bottom field first, a bottom field is displayed first.

Figure 6:
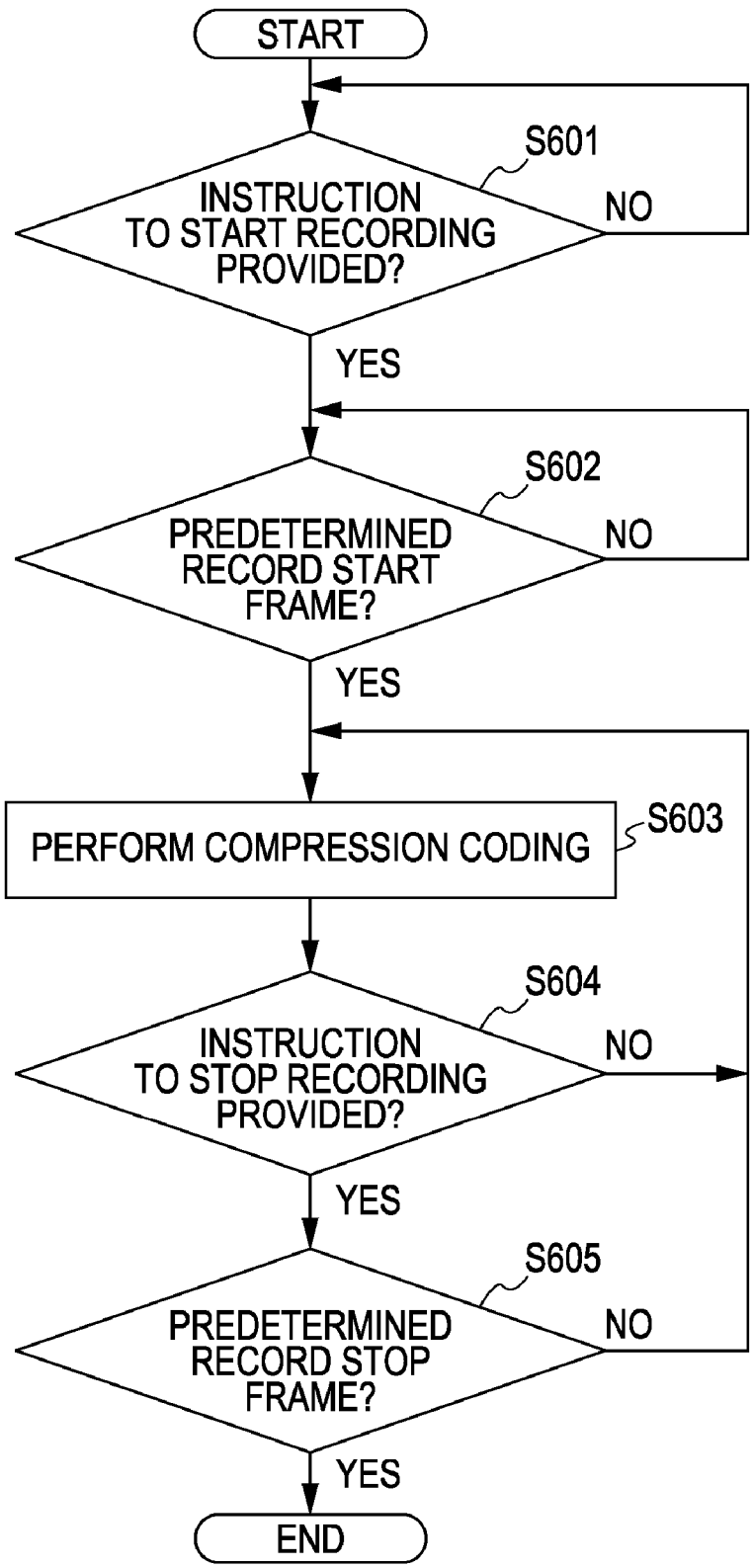
FIG. 6 is a flowchart of a recording process.

A recording process is described below with reference to FIG. 6.

Figure 7:
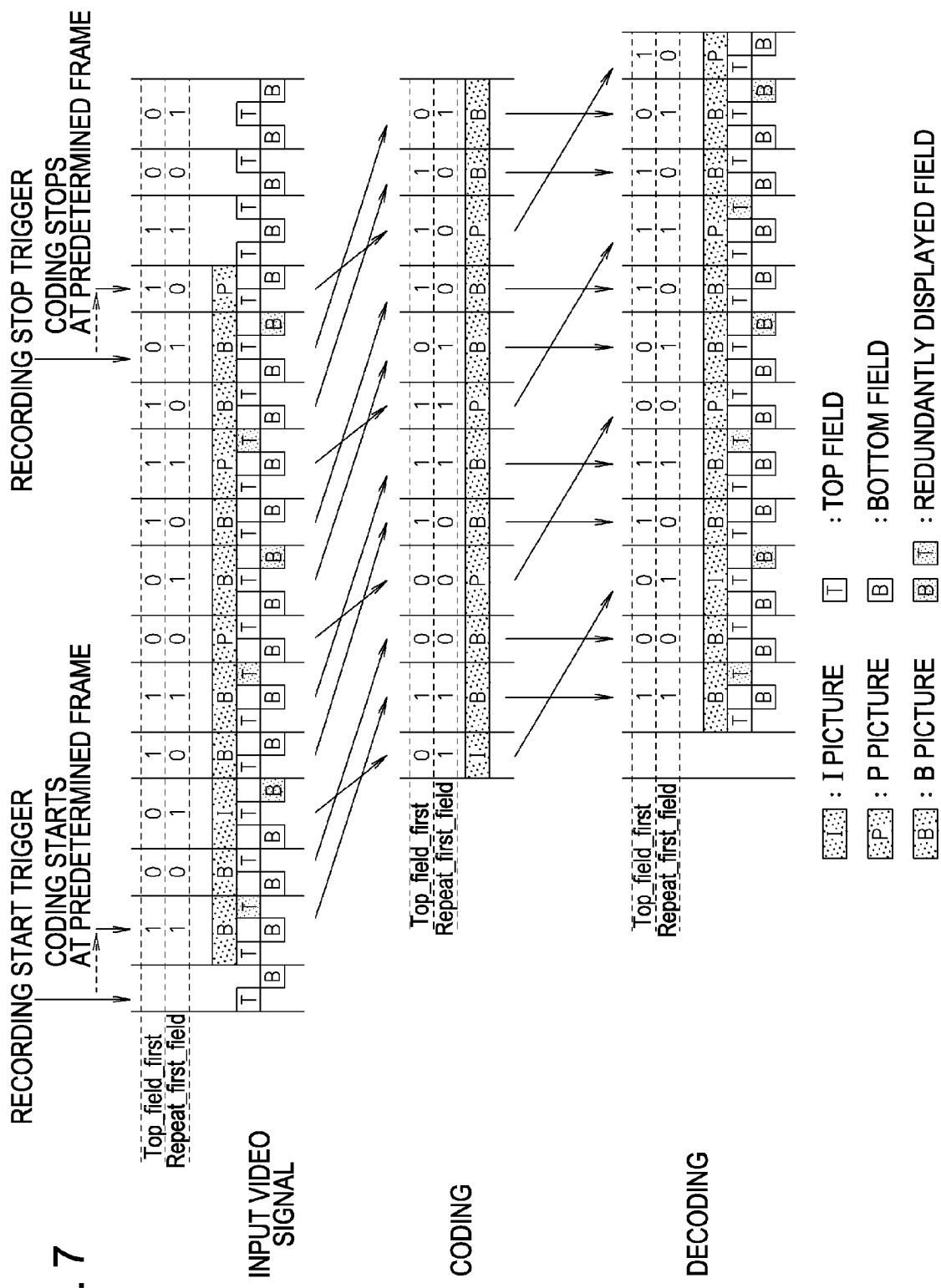
FIG. 7 illustrates how 24p data is coded and decoded.

In step S601, when a video signal is being input to the video-signal input terminal 500, an instruction to start recording on the storage medium is provided through a user interface (not shown). In step S602, coding does not start until a specific frame to start coding, which is described below. When the specific frame is reached, in step S603, compression coding is continuously performed from the specific frame, and the coded data is recorded on the storage medium. When coding is being performed, in step S604, upon receipt of an instruction to stop recording, coding continues up to a specific frame at which coding stops, which is described below, and the coded data is recorded on the storage medium. In step S605, when the specific frame to stop recording is reached, coding stops and a coding process, such as the one illustrated in FIG. 6, ends. FIG. 7 illustrates how an MPEG stream is recorded.

A process of determining a frame at which coding starts is described below with reference to FIGS. 8A to 8D.

FIGS. 8A to 8D illustrate different cases of connection recording of connecting a 24p stream to a 60i or 30p stream that has Top_field_first=1.

Figure 8A:
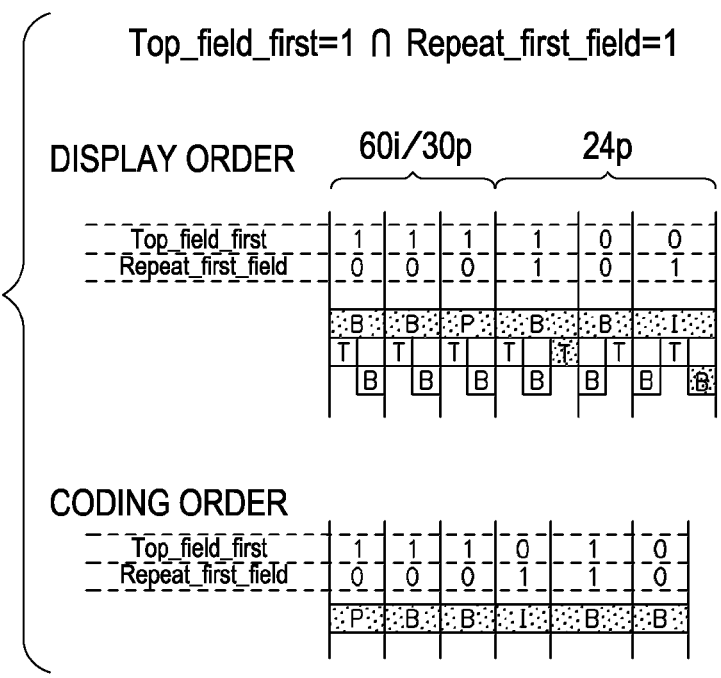
FIGS. 8A to 8D illustrate a connection point at which 60i/30p data is connected to 24p data.

FIG. 8A illustrates a case in which connection recording starts from a frame that has Top_field_first=1 and Repeat_first_field=1 in display order. This case has no problem about the continuity of fields, and appropriate connection recording can be performed. In other words, in FIG. 8A, 24p data is displayed from a top field in display order, and the data is played back without causing a problem.

In coding order, recording starts at an I picture that has Top_field_first=0 and Repeat_first_field=1. Therefore, the I picture is displayed for a period of three fields during playback. In this case, because, in MPEG data, the third bottom field data is a dupliate picture of the first bottom field data, a time period required for decoding is virtually a period of two fields.

A period in which the last B picture data immediately before a connection point in 60i data is two fields. Therefore, at the connection point, while this last B picture is displayed, the leading I picture in 24p data can be decoded.

In coding order, two B pictures subsequent to the leading I picture are three-field data and two-field data, respectively. In coding order, this 24p data repeats in the order of two, three, and two fields. Therefore, no problem arises.

Figure 8B:
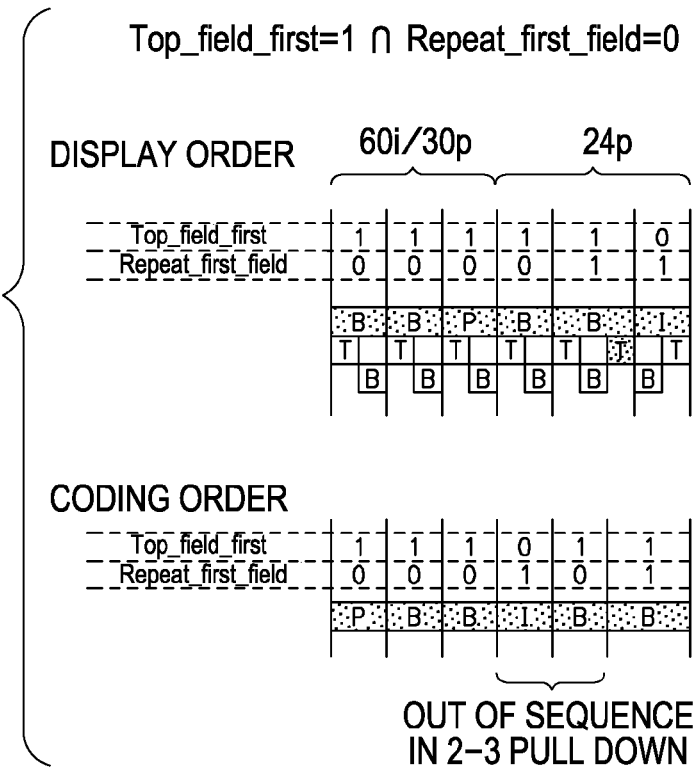

FIG. 8B illustrates a case in which connection recording starts from a frame that has Top_field_first=1 and Repeat_first_field=0 in display order.

In this case, in display order, a top field is displayed first, and the data is played back without causing a problem. In contrast to this, in coding order, two, two, three fields continues, and out of sequence in 2-3 pull down occurs. Therefore, that frame is inappropriate for a frame to start connection recording.

Figure 8C:
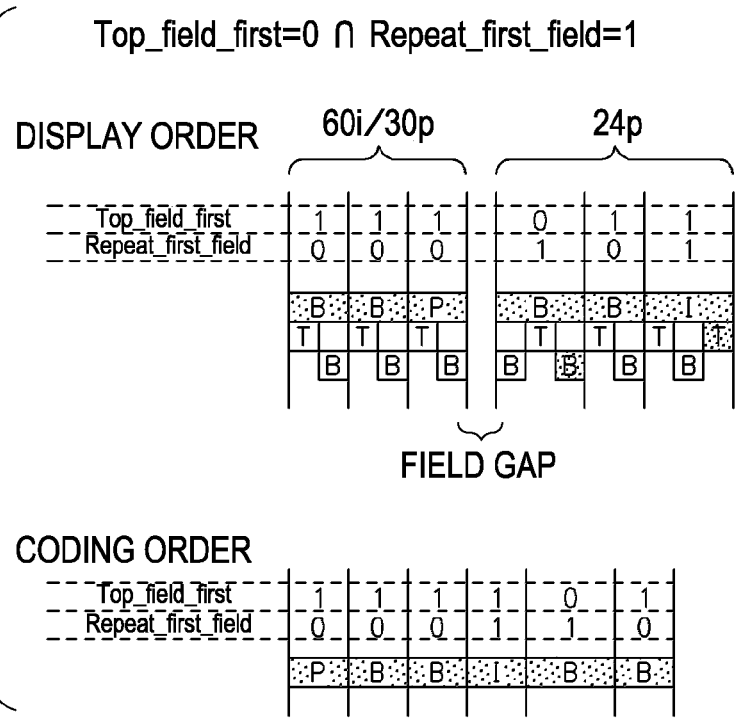

FIG. 8C illustrates a case in which connection recording starts from a frame that has Top_field_first=0 and Repeat_first_field=1 in display order. This case has a field gap (field alternation error) occurring at the leading end of a coded stream. Therefore, this case is inappropriate.

Figure 8D:
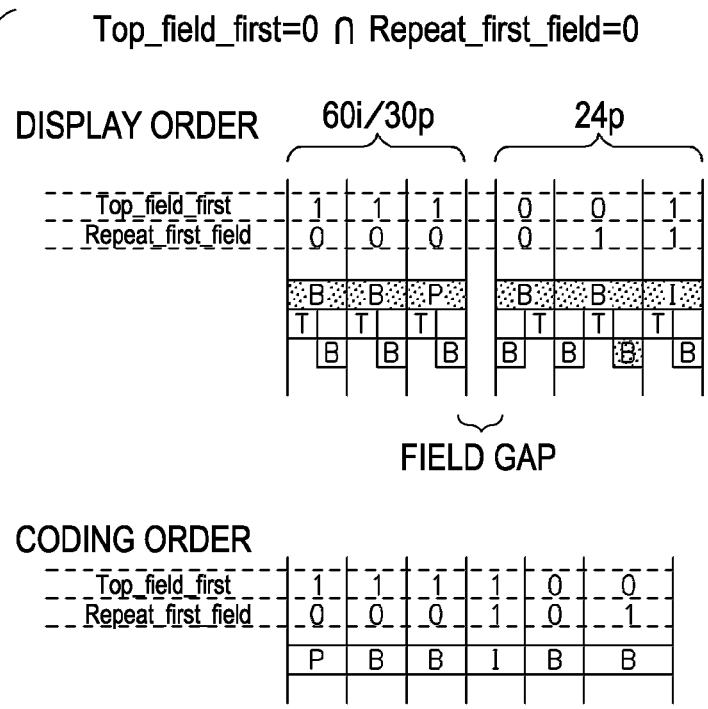

FIG. 8D illustrates a case in which connection recording starts from a frame that has Top_field_first=0 and Repeat_first_field=0 in display order. This case has a field gap (field alternation error) occurring at the leading end of a coded stream. Therefore, this case is inappropriate.

In the case of connection recording in which a 60i or 30p stream is connected to a 60i or 30p stream, irrespective of coding order and display order, coding can start from any frame. In this case, it is necessary to perform coding such that a coded data has the same value of Top_field_first to avoid the occurrence of a field gap.

In the case of connection recording in which a 24p stream is connected to a 24p stream, it is necessary to determine a coding start frame so as to maintain the continuity in 2-3 pull down in display order.

A process of determining a frame at which coding stops is described below with reference to FIGS. 9A to 9D.

FIGS. 9A to 9D illustrate different cases of connection recording of connecting a 60i or 30p stream that has Top_field_first=1 to a 24p stream.

Figure 9A:
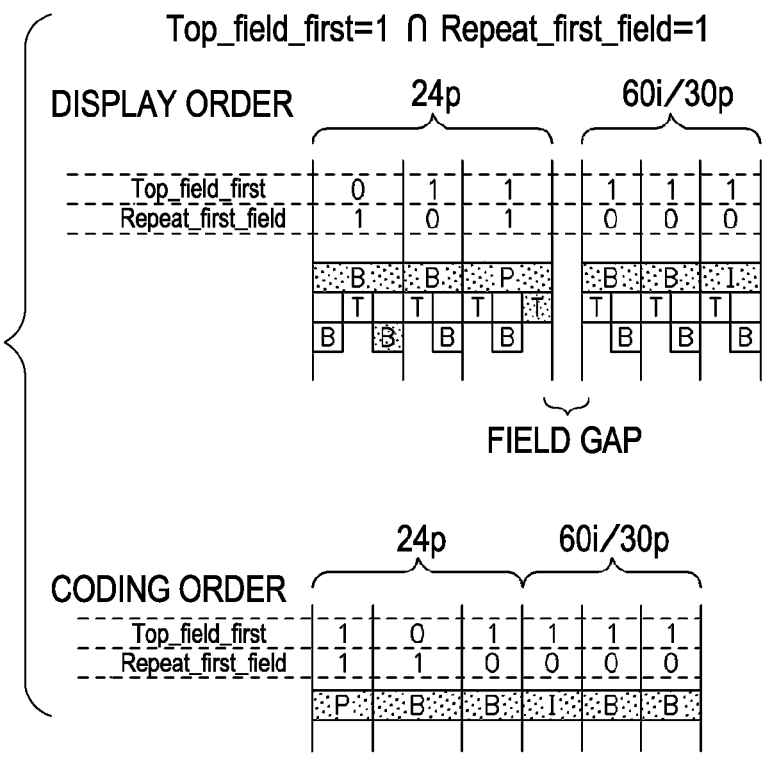
FIGS. 9A to 9D illustrate a connection point at which 24p data is connected to 60i/30p data.

FIG. 9A illustrates a case in which connection recording is performed on a frame that has Top_field_first=1 and Repeat_first_field=1 in display order. In this case, a field gap (field alternation error) occurs at the leading end of a coded stream. Therefore, this case is inappropriate.

Figure 9B:
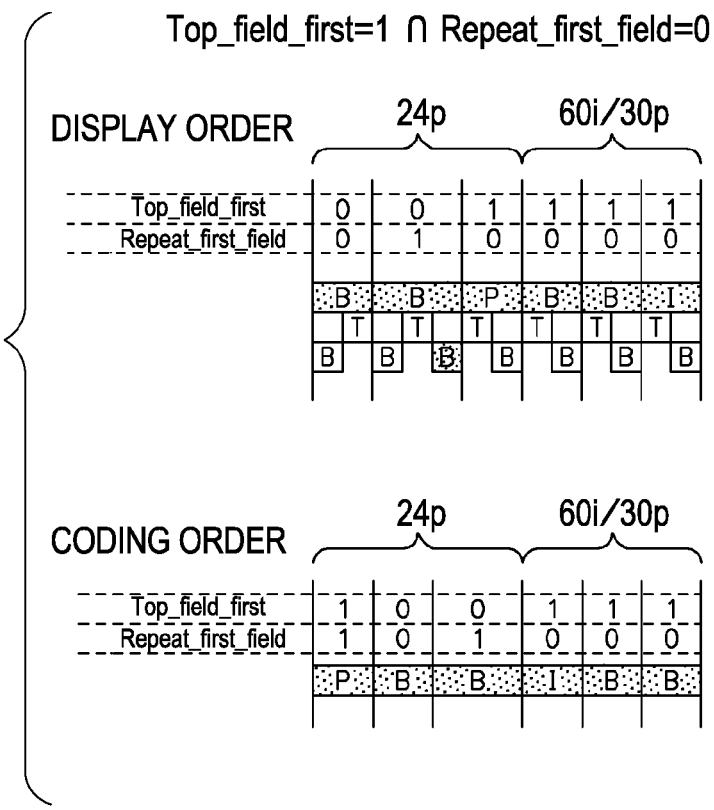

FIG. 9B illustrates a case in which connection recording is performed on a frame that has Top_field_first=1 and Repeat_first_field=0 in display order. This case has no problem about the continuity of fields, and appropriate connection recording can be performed.

Figure 9C:
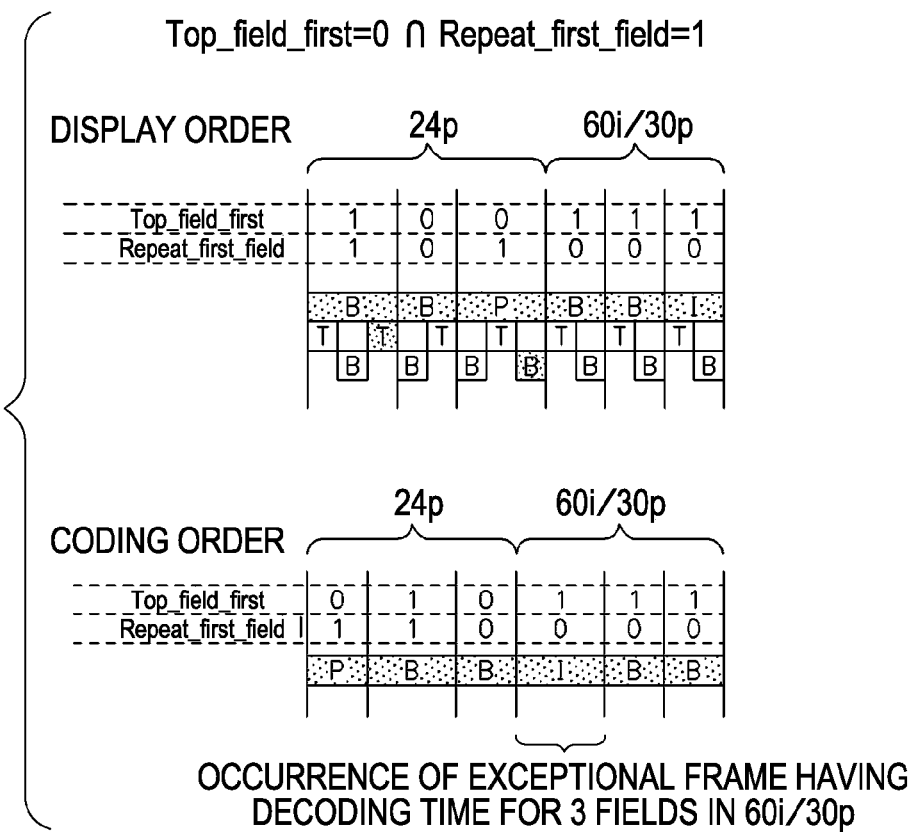

FIG. 9C illustrates a case in which connection recording is performed on a frame that has Top_field_first=0 and Repeat_first_field=1 in display order. This case has an exceptional frame whose decoding time corresponds to a period of three fields occurring at the leading end of the 60i or 30p stream. Therefore, this case is inappropriate.

Figure 9D:
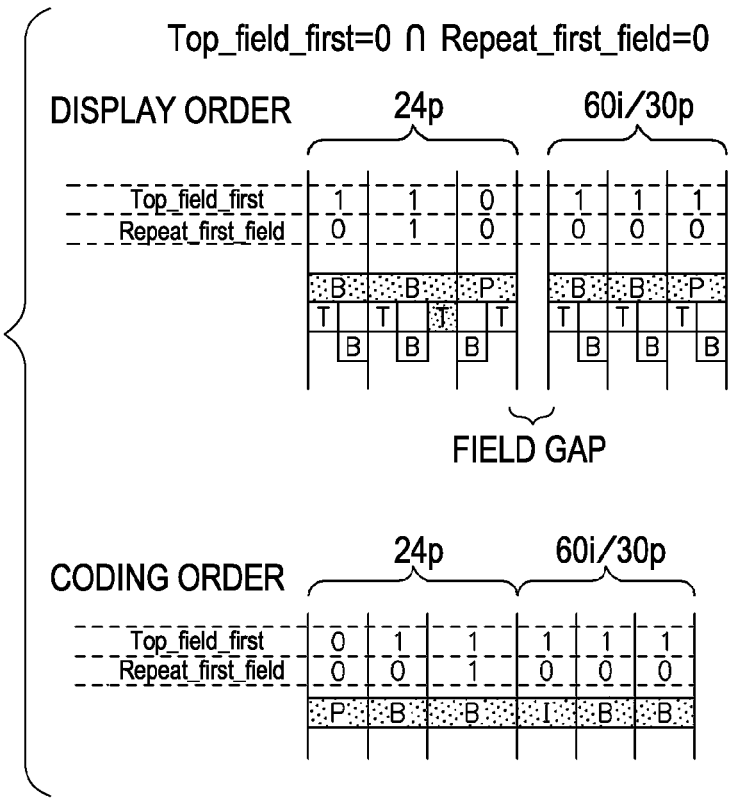

FIG. 9D illustrates a case in which connection recording is performed on a frame that has Top_field_first=0 and Repeat_first_field=0 in display order. This case has a field gap (field alternation error) occurring at the leading end of a coded stream. Therefore, this case is inappropriate.

In the case of connection recording in which a 60i or 30p stream is connected to a 60i or 30p stream, it is necessary to perform coding such that a coded data has the same value of Top_field_first to avoid the occurrence of a field gap. In the case of connection recording in which a 24p stream is connected to a 24p stream, it is necessary to determine a coding stop frame so as to maintain the continuity in 2-3 pull down in display order.

In MPEG, if coding does not stop at an I or P picture in display order, not all frames can be decoded. Therefore, in practice, it is necessary to stop coding at an I or P picture. In this exemplary embodiment, as shown in FIG. 7, an I or P picture frame that has Top_field_first=0 and Repeat_first_field=1 is set as a coding stop frame.

Accordingly, in a recoding apparatus that starts recording and coding a 60i and 30p stream setting Top_field_first=1, a frame that has Top_field_first=1 and Repeat_first_field=1 is set as a coding start frame for a 24p stream (FIG. 8A). As a coding stop frame, a frame that has Top_field_first=1 and Repeat_first_field=0 is set (FIG. 9B). Therefore, connection editing and recording of any combination of 60i, 30p, and 24p can be appropriately performed.

As the leading frame in a compressed and coded stream in display order, in recording a 60i or 30p stream, a top-field-first frame (Top_field_first=1) is set. In recording a 24p stream, a top-field-first frame (Top_field_first=1) that includes a redundant field (Repeat_first_field=1) is set as the leading frame.

As the last frame in a compressed and coded stream in display order, in recording a 60i or 30p stream, a top-field-first frame (Top field first=1) is set. In recording a 24p stream, a top-field-first frame (Top_field_first=1) that includes no redundant field (Repeat_first_field=0) is set as the last frame.

In a recoding apparatus that starts recording and coding a 60i and 30p stream setting Top_field_first=0, a frame that has Top_field_first=0 and Repeat_first_field=1 is set as a coding start frame in a 24p stream. As a coding stop frame, a frame that has Top_field_first=0 and Repeat first field=0 is set. Therefore, connection editing and recording of any combination of 60i, 30p, and 24p can be appropriately performed.

As the leading frame in a compressed and coded stream in display order, in recording of a 60i or 30p stream, a bottom-field-first frame (Top_field_first=0) is set. In recording a 24p stream, a bottom-field-first frame (Top_field_first=0) that includes a redundant field (Repeat_first_field=1) is set as the leading frame.

As the last frame in a compressed and coded stream in display order, in recording of a 60i or 30p stream, a bottom-field-first frame (Top_field_first=0) is set. In recording of a 24p stream, a bottom-field-first frame (Top_field_first=0) that includes no redundant field (Repeat_first_field=0) is set as the last frame.

As described above, the leading and last frames in a compressed and coded stream are determined on the basis of field parity indicating a field to be displayed first (top field or bottom field) and the presence of a redundant field.

In the exemplary embodiment, connection editing and recording between a stream that is compressed and coded lastly and a stream that is to be compressed and coded subsequently is described. However, the present invention is not limited to this exemplary embodiment. In the case of connection editing and recording in which a compressed and coded stream on a storage medium is connected, a frame whose Repeat_first_field and Top_field_first have predetermined values is selected as a connection point. A presentation time stamp (PTS), decoding time stamp (DTS), and VBV_DELAY indicating the amount of usage of VBV buffer of a stream targeted for connection editing and recording at the selected frame are obtained from the storage medium in advance. Starting compression and coding on the basis of these values allows that connection editing and recording to be embodied.

In the exemplary embodiment, the values of Repeat_first_field and Top_field_first are detected by the redundant-field detecting unit 501, and, on the basis of the detected values, compression and coding are performed. However, the present invention is not limited to this exemplary embodiment. A communication unit can be disposed between the controller 504 and a video-signal generating unit (not shown) configured to output a video signal and the like to the video-signal input terminal 500, and the controller 504 can receive the video signal and the like directly from the video-signal generating unit.

In the exemplary embodiment, the last recorded frame is controlled by the compression coding unit 505, and all compressed and coded streams are recorded on the storage medium. However, only some part of the compressed and coded streams can be recorded on the storage medium. In this case, when the streams are recorded on the storage medium, the last frame in display order is controlled so as to be a predetermined frame during writing on the storage medium. A frame after a predetermined frame can be altered into an ending flag and recorded on the storage medium.

The exemplary embodiment can provide an image recording apparatus that is capable of performing connection editing and recording of a compressed and coded bit stream of any combination of 60i, 30p, and 24p. A continuous stream in which neither of a field alternation error nor a field gap occurs during connection editing and recording can be generated by setting a specific frame as the leading frame of a compressed and coded stream in display order. Furthermore, the occurrence of a decoding time period, which is not required in normal cases, at a connection point can be suppressed by setting a specific frame as the last frame of a compressed and coded stream in display order. Therefore, a connection editing and recording stream that can assure decoding performed by an ordinary decoder can be generated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-224479 filed Aug.2, 2005, which is hereby incorporated by reference herein in its entirety.

What is claimed is:

1. A recording apparatus for recording new moving image data on a non-transitory recording medium on which first moving image data of 30 frames per second are already recorded, the first moving image data having a plurality of frames encoded by an intra-frame encoding, forward inter-frame prediction coding, and bidirectional inter-frame prediction coding, each of the plurality of frames of the first moving image data being a top-field-first frame a top field of which is displayed first, the recording apparatus comprising:

a receiving unit configured to receive second moving image data obtained by subjecting moving image data of 24 frames per second to 2-3 pull down processing;

a discrimination unit configured to discriminate that each of the plurality of frames of the second moving image data received by the receiving unit is the top-field-first frame and that each of the plurality of frames of the second moving image data received by the receiving unit has a redundant field;

a coding unit configured to select a coding method from among intra-frame coding, forward inter-frame prediction coding, and bidirectional inter-frame prediction coding in a predetermined order and to encode the second moving image data received by the receiving unit by using the selected coding method;

a recording unit configured to record the second moving image data encoded by the coding unit on the non-transitory recording medium on which the first moving image data are already recorded; and a control unit configured to, in accordance with the discrimination result of the discrimination unit, detect a predetermined frame among the plurality of frames of the second moving image data received by the receiving unit as a leading frame in a display order of the second moving image data to be recorded on the non-transitory recording medium and to control the coding unit to start encoding the second moving image data received by the receiving unit in accordance with the predetermined leading frame, wherein, in accordance with the discrimination result of the discrimination unit regarding each of the plurality of frames of the second moving image data, the control unit does not detect frames other than the predetermined frame among the plurality of frames of the second moving image data received by the receiving unit as the leading frame, and wherein the predetermined frame is a frame which is the top-field-first frame and has the redundant field from among the plurality of frames of the second moving image data received by the receiving unit.

2. The recording apparatus according to claim 1, wherein the control unit controls the coding unit to encode the leading frame using the bidirectional inter-frame prediction coding and to encode a frame that is after a predetermined number of frames from the leading frame using the intra-frame coding.

3. The recording apparatus according to claim 2, wherein the coding unit is configured to start coding at a frame that is after a predetermined number of frames from the leading frame.

4. The recording apparatus according to claim 1, wherein the control unit controls the recording unit to record the second moving image data on the non-transitory recording medium such that the new recorded second moving image data are reproduced subsequently to the first moving image data.

5. The recording apparatus according to claim 1, wherein the first moving image data are image data of progressive type.

6. The recording apparatus according to claim 1, wherein the first moving image data are image data of interlaced type.

7. The recording apparatus according to claim 1, wherein a coding order of the plurality of frames of the second moving image data encoded by the coding unit is different from the display order of the plurality of frames of the second moving image data.

* * * * *